(12) United States Patent
Pillay et al.

(10) Patent No.: US 6,782,300 B2
(45) Date of Patent: Aug. 24, 2004

(54) CIRCUITS AND METHODS FOR EXTRACTING A CLOCK FROM A BIPHASE ENCODED BIT STREAM AND SYSTEMS USING THE SAME

(75) Inventors: Sanjay Ramakrishna Pillay, Austin, TX (US); Hasibur Rahman, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 805 days.

(21) Appl. No.: 09/730,284

(22) Filed: Dec. 5, 2000

(65) Prior Publication Data

US 2003/0195645 A1 Oct. 16, 2003

(51) Int. Cl.⁷ .............................................. G06F 17/00
(52) U.S. Cl. ........................ 700/94; 375/333; 375/361
(58) Field of Search ................................. 375/333, 354, 375/355, 356, 357, 359, 361, 373; 700/94

(56) References Cited

U.S. PATENT DOCUMENTS

| | | | |
|---|---|---|---|
| 5,465,268 A | | 11/1995 | Rainbolt |
| 6,249,555 B1 | * | 6/2001 | Rainbolt ..................... 375/354 |
| 6,567,487 B1 | * | 5/2003 | Pilz ........................... 375/361 |

FOREIGN PATENT DOCUMENTS

| | | |
|---|---|---|
| DE | 36 32 719 A | 3/1988 |
| EP | 0 453 063 A2 | 10/1991 |
| EP | 0 930 713 A | 7/1999 |
| WO | WO 98 16040 A | 4/1998 |

* cited by examiner

Primary Examiner—Stella Woo
(74) Attorney, Agent, or Firm—James J. Murphy; Thompson & Knight LLP

(57) ABSTRACT

A method of extracting a clock from a biphase encoded bit stream includes the step of detecting a stream of samples each having a sample size measured between consecutive bit phase transitions. A sample length is determined for each sample, the sample length approximating a number of least common multiples in the corresponding sample size. A preamble is detected from the sample lengths of a sequence of the samples and decoded to determine an expected logic level of the clock following a transition at an expected clock edge. The expected level of the clock is gated with the biphase encoded data to generate a control signal in advance of the opening of the time window. The control signal is then gated with the biphase encoded data to extract the clock edge after the time window has opened.

21 Claims, 12 Drawing Sheets

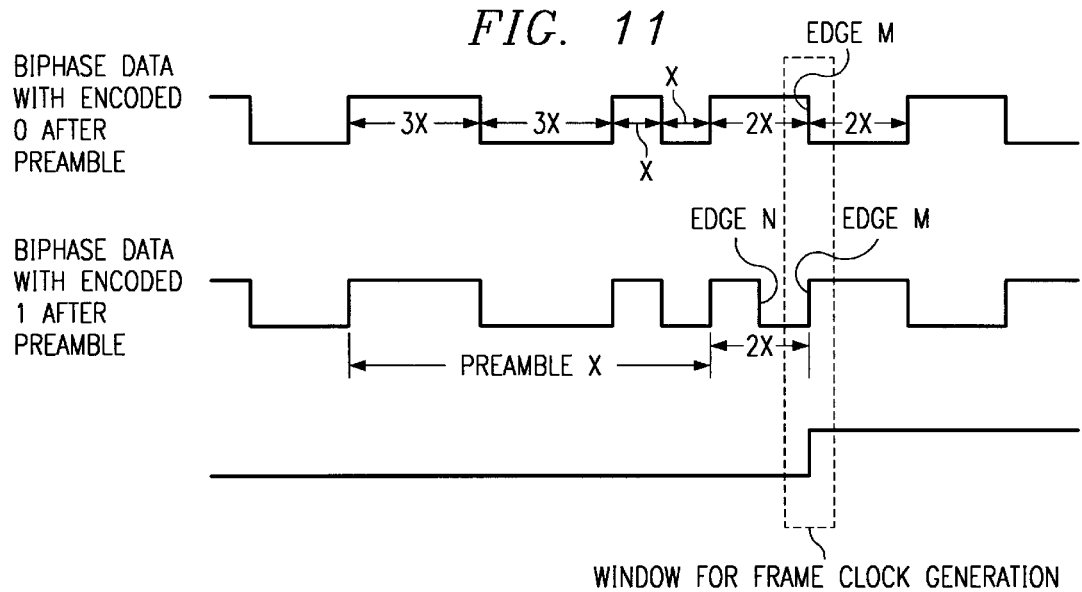
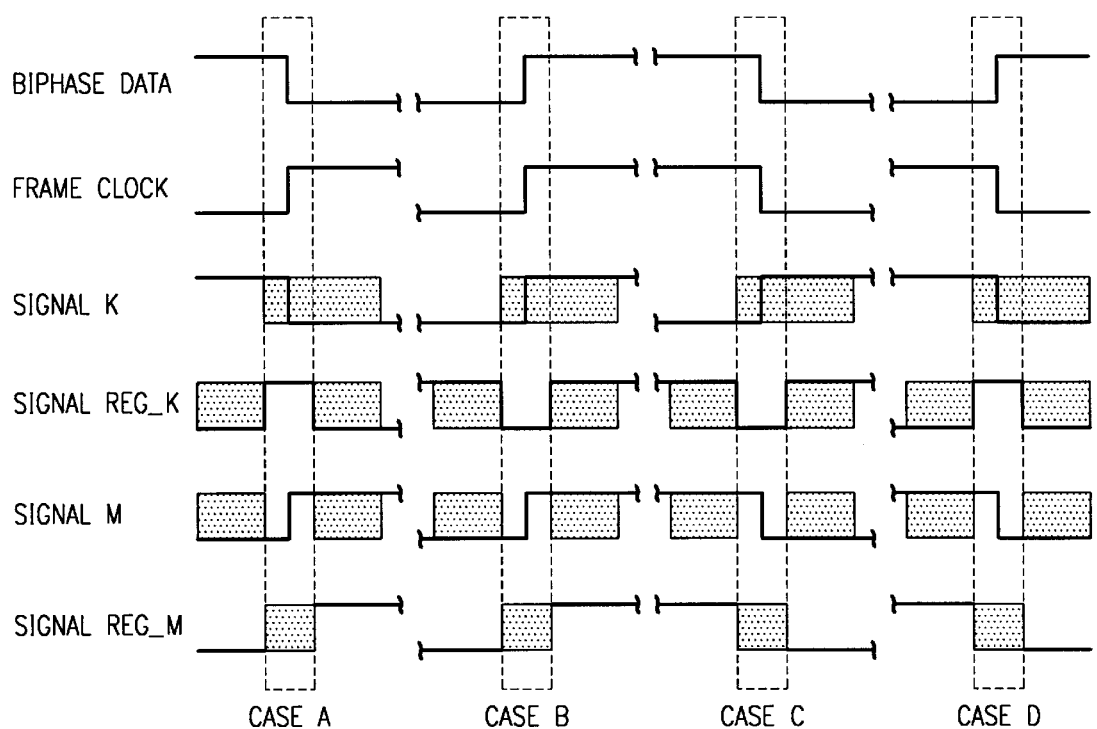

CIRCUITS AND METHODS FOR EXTRACTING A CLOCK FROM A BIPHASE ENCODED BIT STREAM AND SYSTEMS USING THE SAME

BACKGROUND OF THE INVENTION

1. Field of the Invention

The present invention relates in general to electronic data links and in particular, to methods and circuits for extracting a clock from a biphase encoded bit stream and systems using the same.

2. Description of the Related Art

Biphase encoding has the significant advantage of allowing data, control signals, and embedded clocks to be transferred serially across a single conductor. Generally, data is generated by the transmitter by selectively using the active and inactive edges of a Bit Clock. For example, in the most common encoding scheme, data bits of logic value 0 are represented by making logic level transitions only on the active bit clock edges and data bits of logic value 1 are represented by making logic level transitions on both the active and inactive bit clock edges. At the receiver, both the data and the embedded clocks, including the Bit Clock and the Frame Clock, are extracted.

One particular application of biphase encoding is in the transmission of digital audio data between various systems and devices. The AES/EBU (Audio Engineering Society/European Broadcasting Union) interface is one application which supports the encoding, transmission and decoding of two channels of digital audio data, along with control information and error correction bits. In this Professional Status Block format, data can be transferred via a coaxial transmission line or a twisted shielded pair. The S/PDIF (Sony—Phillips Digital Interface) is the consumer variant of the AES/EBU standard, and supports data transmission via either a coaxial or an optical physical layer. In both cases, only a single conductor is required between the transmitting and receiving devices, as mentioned above.

Current techniques for extracting the embedded clocks from a biphase encoded data stream rely on a phase locked loop (PLL), along with prior knowledge of the frequency of the Frame Clock. Generally, the PLL is set up with the appropriate operating conditions to generate clock signal of a selected multiple of the Frame Clock. This clock signal is then used to decode the bitstream. Among other things, these techniques require additional hardware and require the prior knowledge of the Frame Clock frequency.

Consequently, the need has arisen for improved techniques for extracting embedded clocks from a bitstream, such as a biphase encoded bitstream. The amount of hardware required should be minimized and prior knowledge of the Frame Clock frequency should not be required. Moreover, jitter in the Frame Clock should also be minimized. These techniques should be applicable to a wide range of circuits and systems operating on biphase encoded, including, but not limited to, those processing AES/EBU and S/PDIF data.

SUMMARY OF THE INVENTION

According to one embodiment of the principles of the present invention a method is disclosed for generating a frame clock from a biphase encoded bit audio stream. A sequence of bit phase transitions in the audio bit stream is detected, each pair of consecutive bit phase transitions defining a sample having a sample size. During a preamble detection phase, a sample length is determined for each of the sequence of samples by determining a number of predetermined least common multiples in the corresponding sample size and then decoding the sample lengths for the sequence of samples to identify a preamble of a given preamble type. During a data detection phase, the sample lengths for a sequence of data bits are determined from the biphase bit stream and the sample lengths of the sequence of data bits decoded into binary data bits. The frame clock is generated by determining an expected value of the frame clock level and performing an XNOR operation using the expected value of the frame clock level and the bit phase data to generate an intermediate signal. During a time window, the intermediate signal is registered with an oversampling clock and the registered intermediate signal and the biphase date used in the XOR operation during the time window to generate the clock edge of the frame clock.

The principles of the present invention have a number of advantages over prior art clock extraction schemes. Among other things, no prior information about the clock being extracted is required. Moreover, these principles can be applied to clocks of many different frequencies. While not limited thereto, the disclosed principles and circuits can advantageously be applied to the extraction of clocks from AES/EBU and S/PDIF bit streams.

BRIEF DESCRIPTION OF THE DRAWINGS

For a more complete understanding of the present invention, and the advantages thereof, reference is now made to the following descriptions taken in conjunction with the accompanying drawings, in which:

FIG. 11 illustrates the transition as Edge M;

DESCRIPTION OF THE PREFERRED EMBODIMENTS

The principles of the present invention and their advantages are best understood by referring to the illustrated embodiment depicted in FIGS. 1–12 of the drawings, in which like numbers designate like parts.

Figure 1A:
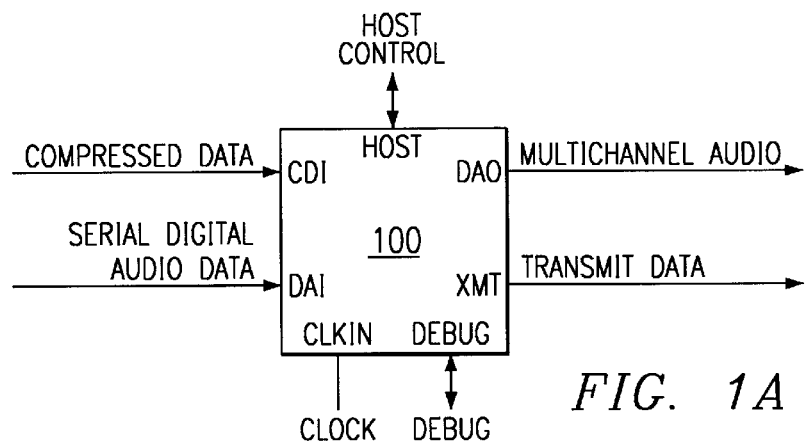
FIG. 1A is a diagram of a multichannel audio decoder embodying the principles of the present invention.

FIG. 1A is a general overview of an audio information decoder 100 embodying the principles of the present invention. Decoder 100 is operable to receive data in any one of a number of formats, including compressed data in conforming to the AC-3 digital audio compression standard, (as defined by the United States Advanced Television System Committee) through a compressed data input port CDI. An independent digital audio data (DAI) port provides for the input of PCM, S/PDIF, or non-compressed digital audio data.

A digital audio output (DAO) port provides for the output of multiple-channel decompressed digital audio data. Independently, decoder 100 can transmit data in the S/PDIF (Sony-Phillips Digital Interface) format through transmit port XMT.

Decoder 100 operates under the control of a host microprocessor through a host port HOST and supports debugging by an external debugging system through the debug port DEBUG. The CLK port supports the input of a master clock for generation of the timing signals within decoder 100.

While decoder 100 can be used to decompress other types of compressed digital data, it is particularly advantageous to use decoder 100 for decompression of AC-3 bitstreams.

Therefore, for understanding the utility and advantages of decoder 100, consider the case of when the compressed data received at the compressed data input (CDI) port has been compressed in accordance with the AC-3 standard.

Generally, AC-3 data is compressed using an algorithm which achieves high coding gain (i.e., the ratio of the input bit rate to the output bit rate) by coarsely quantizing a frequency domain representation of the audio signal. To do so, an input sequence of audio PCM time samples is transformed to the frequency domain as a sequence of blocks of frequency co-efficients. Generally, these overlapping blocks, each composed of 512 time samples, are multiplied by a time window and transformed into the frequency domain. Because the blocks of time samples overlap, each PCM input sample is represented by two sequential blocks factor transformated into the frequency domain. The frequency domain representation may then be decimated by a factor of two such that each block contains 256 frequency coefficients, with each frequency coefficient represented in binary exponential notation as an exponent and a mantissa.

Next, the exponents are encoded into coarse representation of the signal spectrum (spectral envelope), which is in turn used in a bit allocation routine that determines the number of bits required to encoding each mantissa. The spectral envelope and the coarsely quantized mantissas for six audio blocks (1536 audio samples) are formatted into an AC-3 frame. An AC bit stream is a sequence of the AC-3 frames.

In addition to the transformed data, the AC-3 bit stream also includes additional information. For instance, each frame may include a frame header which indicates the bit rate, sample rate, number of encoded samples, and similar information necessary to subsequently synchronize and decode the AC-3 bit stream. Error detection codes may also be inserted such that the device such as decoder 100 can verify that each received frame of AC-3 data does not contain any errors. A number of additional operations may be performed on the bit stream before transmission to the decoder. For a more complete definition of AC-3 compression, reference is now made to the digital audio compression standard (AC-3) available from the advanced televisions systems committee, incorporated herein by reference.

In order to decompress under the AC-3 standard, decoder 100 essentially must perform the inverse of the above described process. Among other things, decoder 100 synchronizes to the received AC-3 bit stream, checks for errors and deformats the received AC-3 data audio. In particular, decoder 100 decodes spectral envelope and the quantitized mantissas. A bit allocation routine is used to unpack and de-quantitize the mantissas. The spectral envelope is encoded to produce the exponents, then, a reverse transformation is performed to transform the exponents and mantissas to decoded PCM samples in the time domain.

Figure 1B:
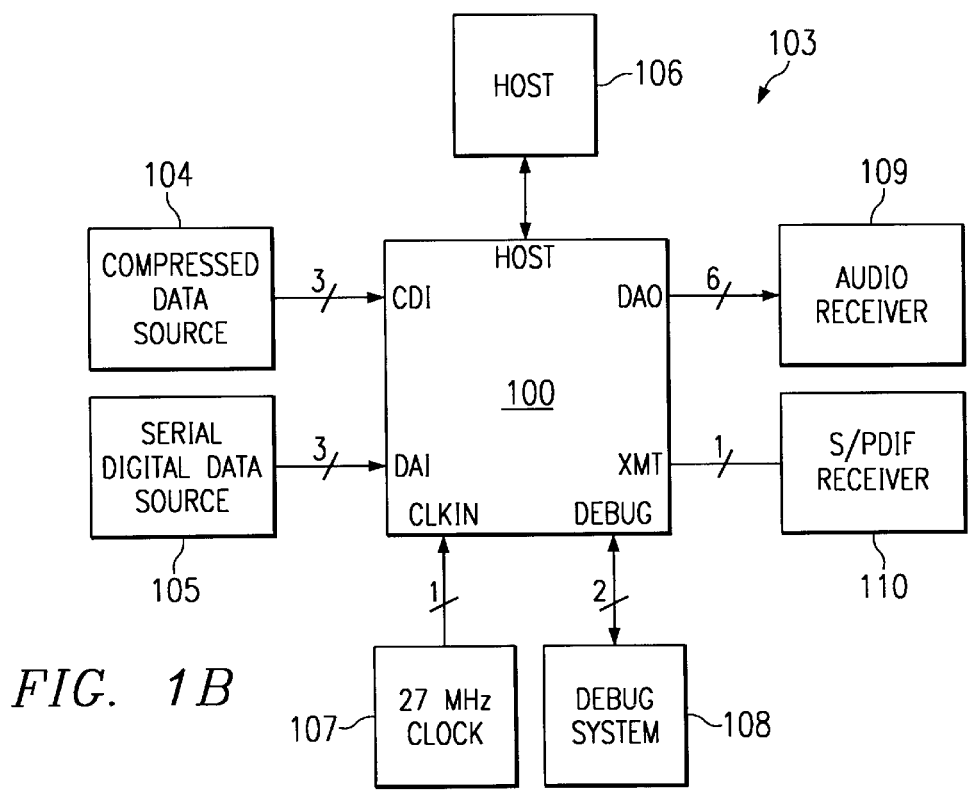
FIG. 1B is a diagram showing the decoder of FIG. 1 in an exemplary system context.

FIG. 1B shows decoder 100 embodied in a representative system 103. Decoder 100 as shown includes three compressed data input (CDI) pins for receiving compressed data from a compressed audio data source 104 and an additional three digital audio input (DAI) pins for receiving serial digital audio data from a digital audio source 105. Examples of compressed serial digital audio source 105, and in particular of AC-3 compressed digital sources, are digital video discs and laser disc players.

Host port (HOST) allows coupling to a host processor 106, which is generally a microcontroller or microprocessor that maintains control over the audio system 103. For instance, in one embodiment, host processor 106 is the microprocessor in a personal computer (PC) and System 103 is a PC-based sound system. In another embodiment, host processor 106 is a microcontroller in an audio receiver or controller unit and system 103 is a non-PC-based entertainment system such as conventional home entertainment systems produced by Sony, Pioneer, and others. A master clock, shown here, is generated externally by clock source 107. The debug port (DEBUG) consists of two lines for connection with an external debugger, which is typically a PC-based device.

Decoder 100 has six output lines for outputting multi-channel audio digital data (DAO) to digital audio receiver 109 in any one of a number of formats including 3-lines out, 2/2/2, 4/2/0, 4/0/2 and 6/0/0. A transmit port (XMT) allows for the transmission of S/PDIF data to an S/PDIF receiver 110. These outputs may be coupled, for example, to digital to analog converters or codecs for transmission to analog receiver circuitry.

Figure 1C:
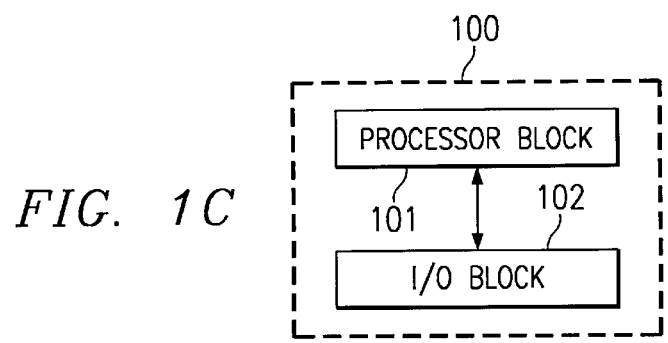
FIG. 1C is a diagram showing the partitioning of the decoder into a processor block and an input/output (I/O) block.

FIG. 1C is a high level functional block diagram of a multichannel audio decoder 100 embodying the principles of the present invention. Decoder 100 is divided into two major sections, a Processor Block 101 and the I/O Block 102. Processor Block 106 includes two digital signal processor (DSP) cores, DSP memory, and system reset control. I/O Block 102 includes interprocessor communication registers, peripheral I/O units with their necessary support logic, and interrupt controls. Blocks 101 and 102 communicate via interconnection with the I/O buses of the respective DSP cores. For instance, I/O Block 102 can generate interrupt requests and flag information for communication with Processor Block 101. All peripheral control and status registers are mapped to the DSP I/O buses for configuration by the DSPs.

Figure 2:
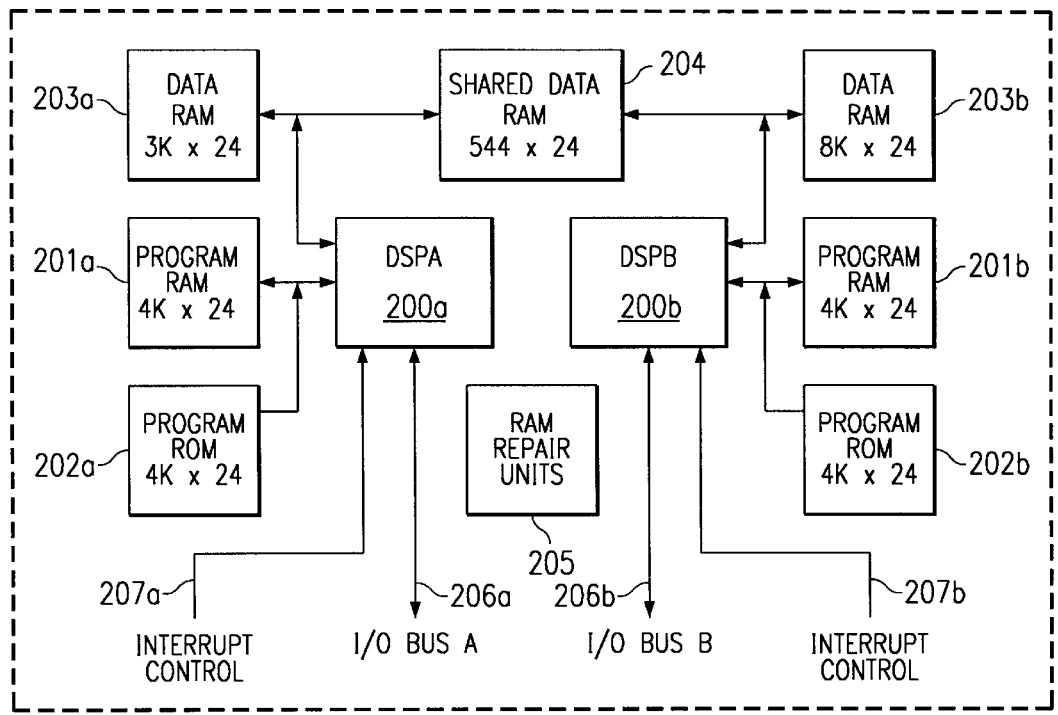
FIG. 2 is a diagram of the processor block of FIG. 1C.

FIG. 2 is a detailed functional block diagram of processor block 101. Processor block 101 includes two DSP cores 200a and 200b, labeled DSPA and DSPB respectively. Cores 200a and 200b operate in conjunction with respective dedicated program RAM 201a and 201b, program ROM 202a and 202b, and data RAM 203a and 203b. Shared data RAM 204, which the DSPs 200a and 200b can both access, provides for the exchange of data, such as PCM data and processing coefficients, between processors 200a and 200b. Processor block 101 also contains a RAM repair unit 205 that can repair a predetermined number of RAM locations within the on-chip RAM arrays to increase die yield.

DSP cores 200a and 200b respectively communicate with the peripherals through I/O Block 102 via their respective I/O buses 206a, 206b. The peripherals send interrupt and flag information back to the processor block via interrupt interfaces 207a, 207b.

Figure 3:
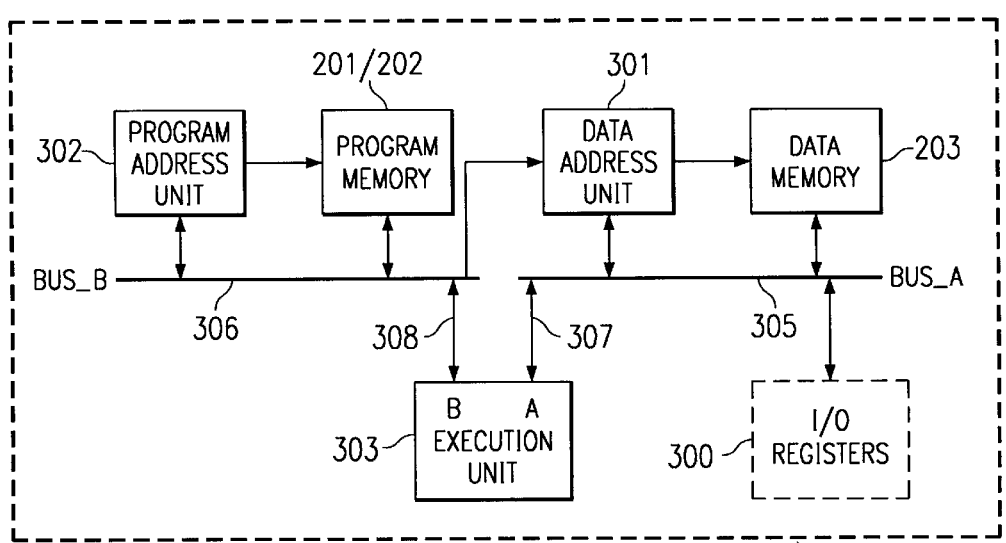
FIG. 3 is a diagram of the primary functional subblocks of the I/O block of FIG. 1C.

FIG. 3 is a detailed functional block diagram of I/O block 102. Generally, I/O block 102 contains peripherals for data input, data output, communications, and control. Input Data Unit 1300 accepts either compressed analog data or digital audio in any one of several input formats (from either the CDI or DAI ports). Serial/parallel host interface 1301 allows an external controller to communicate with decoder 100 through the HOST port. Data received at the host interface port 1301 can also be routed to input data unit 1300.

IPC (Inter-processor Communication) registers 1302 support a control-messaging protocol for communication between processing cores 200 over a relatively low-bandwidth communication channel. High-bandwidth data can be passed between cores 200 via shared memory 204 in processor block 101.

Clock manager 1303 is a programmable PLL/clock synthesizer that generates common audio clock rates from any selected one of a number of common input clock rates through the CLKIN port. Clock manager 1303 includes an STC counter which generates time information used by processor block 101 for managing playback and synchronization tasks. Clock manager 1303 also includes a programmable timer to generate periodic interrupts to processor block 101.

Debug circuitry 1304 is provided to assist in applications development and system debug using an external DEBUGGER and the DEBUG port, as well as providing a mechanism to monitor system functions during device operation.

A Digital Audio Output port 1305 provides multichannel digital audio output in selected standard digital audio formats. A Digital Audio Transmitter 1306 provides digital audio output in formats compatible with S/PDIF or AES/EBU.

In general, I/O registers are visible on both I/O buses, allowing access by either DSPA (200a) or DSPB (200b). Any read or write conflicts are resolved by treating DSPB as the master and ignoring DSPA.

The principles of the present invention further allow for methods of controlling the tone levels of decompressed audio data, as well as for methods and software for operating decoder 100. These principles will be discussed in further detail below. Initially, a brief discussion of the theory of operation of decoder 100 will be undertaken.

In a dual-processor environment like decoder 100, it is important to partition the software application optimally between the two processors 200a, 200b to maximize processor usage and minimize inter-processor communication. For this, the dependencies and scheduling of the tasks of each processor must be analyzed. The algorithm must be partitioned such that one processor does not unduly wait for the other and later be forced to catch up with pending tasks. For example, in most audio decompression tasks including Dolby AC-3®, the algorithm being executed consists of 2 major stages: 1) parsing the input bitstream with specified/computed bit allocation and generating frequency-domain transform coefficients for each channel; and 2) performing the inverse transform to generate time-domain PCM samples for each channel. Based on this and the hardware resources available in each processor, and accounting for other housekeeping tasks the algorithm can be suitably partitioned.

Usually, the software application will explicitly specify the desired output precision, dynamic range and distortion requirements. Apart from the intrinsic limitation of the compression algorithm itself, in an audio decompression task the inverse transform (reconstruction filter bank) is the stage which determines the precision of the output. Due to the finite-length of the registers in the DSP, each stage of processing (multiply+accumulate) will introduce noise due to elimination of the lesser significant bits. Adding features such as rounding and wider intermediate storage registers can alleviate the situation.

For example, Dolby AC-3® requires 20-bit resolution PCM output which corresponds to 120 dB of dynamic range. The decoder uses a 24-bit DSP which incorporates rounding, saturation and 48-bit accumulators in order to achieve the desired 20-bit precision. In addition, analog performance should at least preserve 95 dB S/N and have a frequency response of +/−0.5 dB from 3 Hz to 20 kHz.

Based on application and design requirements, a complex real-time system, such as audio decoder 100, is usually partitioned into hardware, firmware and software. The hardware functionality described above is implemented such that it can be programmed by software to implement different applications. The firmware is the fixed portion of software portion including the boot loader, other fixed function code and ROM tables. Since such a system can be programmed, it is advantageously flexible and has less hardware risk due to simpler hardware demands.

There are several benefits to the dual core (DSP) approach according to the principles of the present invention. DSP cores 200A and 200B can work in parallel, executing different portions of an algorithm and increasing the available processing bandwidth by almost 100%. Efficiency improvement depends on the application itself. The important thing in the software management is correct scheduling, so that the DSP engines 200A and 200B are not waiting for each other. The best utilization of all system resources can be achieved if the application is of such a nature that can be distributed to execute in parallel on two engines. Fortunately, most of the audio compression algorithms fall into this category, since they involve a transform coding followed by fairly complex bit allocation routine at the encoder. On the decoder side the inverse is done. Firstly, the bit allocation is recovered and the inverse transform is performed. This naturally leads into a very nice split of the decompression algorithm. The first DSP core (DSPA) works on parsing the input bitstream, recovering all data fields, computing bit allocation and passing the frequency domain transform coefficients to the second DSP (DSPB), which completes the task by performing the inverse transform (IFFT or IDCT depending on the algorithm). While the second DSP is finishing the transform for a channel n, the first DSP is working on the channel n+1, making the processing parallel and pipelined. The tasks are overlapping in time and as long as tasks are of similar complexity, there will be no waiting on either DSP side.

Figure 4:
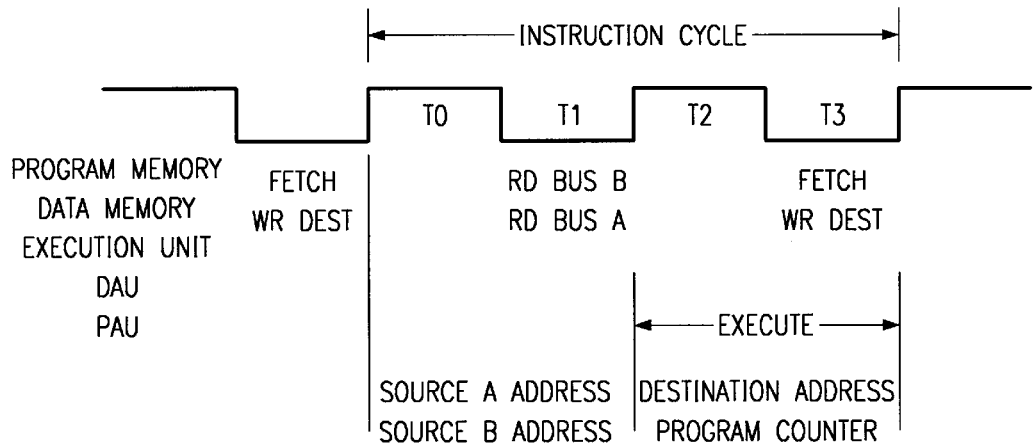
FIG. 4 is a diagram of the interprocessor communications (IPC) registers as shown in FIG. 3.

Decoder 100, as discussed above, includes shared memory of 544 words as well as communication "mailbox" (IPC block 1302) consisting of 10 I/O registers (5 for each direction of communication). FIG. 4 is a diagram representing the shared memory space and IPC registers (1302).

One set of communication registers looks like this
(a) AB_command_register (DSPA write/read, DSPB read only)
(b) AB_parameter1_register (DSPA write/read, DSPB read only)
(c) AB_parameter2_register (DSPA write/read, DSPB read only)
(d) AB_message_semaphores (DSPA write/read, DSPB write/read as well)
(e) AB_shared_memory semaphores (DSPA write/read, DSPB read only) where AB denotes the registers for communication from DSPA to DSPB. Similarly, the BA set of registers are used in the same manner, with simply DSPB being primarily the controlling processor.

Shared memory 204 is used as a high throughput channel, while communication registers serve as low bandwidth channel, as well as semaphore variables for protecting the shared resources.

Both DSPA and DSPA 200a, 200b can write to or read from shared memory 204. However, software management provides that the two DSPs never write to or read from shared memory in the same clock cycle. It is possible, however, that one DSP writes and the other reads from shared memory at the same time, given a two-phase clock in the DSP core. This way several virtual channels of communications could be created through shared memory. For example, one virtual channel is transfer of frequency domain coefficients of AC-3 stream and another virtual channel is transfer of PCM data independently of AC-3. While DSPA is putting the PCM data into shared memory, DSPB might be reading the AC-3 data at the same time. In this case both virtual channels have their own semaphore variables which reside in the AB_shared_memory semaphores registers and also different physical portions of shared memory are dedicated to the two data channels. AB_command_register is connected to the interrupt logic so that any write access to that register by DSPA results in an interrupt being generated on the DSPB, if enabled. In general, I/O registers are designed to be written by one DSP and read by another. The only exception is AB_message_sempahore register which can be written by both DSPs. Full symmetry in communication is provided even though for most applications the data flow is from DSPA to DSPB. However, messages usually flow in either direction, another set of 5 registers are provided as shown in FIG. 4 with BA prefix, for communication from DSPB to DSPA.

The AB_message_sempahore register is very important since it synchronizes the message communication. For example, if DSPA wants to send the message to DSPB, first it must check that the mailbox is empty, meaning that the previous message was taken, by reading a bit from this register which controls the access to the mailbox. If the bit is cleared, DSPA can proceed with writing the message and setting this bit to 1, indicating a new state, transmit mailbox full. DSPB may either poll this bit or receive an interrupt (if enabled on the DSPB side), to find out that new message has arrived. Once it processes the new message, it clears the flag in the register, indicating to DSPA that its transmit mailbox has been emptied. If DSPA had another message to send before the mailbox was cleared it would have put in the transmit queue, whose depth depends on how much message traffic exists in the system. During this time DSPA would be reading the mailbox full flag. After DSPB has cleared the flag (set it to zero), DSPA can proceed with the next message, and after putting the message in the mailbox it will set the flag to I. Obviously, in this case both DSPs have to have both write and read access to the same physical register. However, they will never write at the same time, since DSPA is reading flag until it is zero and setting it to 1, while DSPB is reading the flag (if in polling mode) until it is 1 and writing a zero into it. These two processes a staggered in time through software discipline and management.

When it comes to shared memory a similar concept is adopted. Here the AB_shared_memory_semaphore register is used. Once DSPA computes the transform coefficients but before it puts them into shared memory, it must check that the previous set of coefficients, for the previous channel has been taken by the DSPB. While DSPA is polling the semaphore bit which is in AB_shared_memory_semaphore register it may receive a message from DSPB, via interrupt, that the coefficients are taken. In this case DSPA resets the semaphore bit in the register in its interrupt handler. This way DSPA has an exclusive write access to the AB_shared_memory_semaphore register, while DSPB can only read from it. In case of AC-3, DSPB is polling for the availability of data in shared memory in its main loop, because the dynamics of the decode process is data driven. In other words there is no need to interrupt DSPB with the message that the data is ready, since at that point DSPB may not be able to take it anyway, since it is busy finishing the previous channel. Once DSPB is ready to take the next channel it will ask for it. Basically, data cannot be pushed to DSPB, it must be pulled from the shared memory by DSPB.

The exclusive write access to the AB_shared_memory_semaphore register by DSPA is all that more important if there is another virtual channel (PCM data) implemented. In this case, DSPA might be putting the PCM data into shared memory while DSPB is taking AC-3 data from it. So, if DSPB was to set the flag to zero, for the AC-3 channel, and DSPA was to set PCM flag to 1 there would be an access collision and system failure will result. For this reason, DSPB is simply sending message that it took the data from shared memory and DSPA is setting shared memory flags to zero in its interrupt handler. This way full synchronization is achieved and no access violations performed.

For a complete description of exemplary decoder 100 and its advantages, reference is now made to coassigned U.S. Pat. No. 6,081,783 entitled "DIGITAL AUDIO DECODING CIRCUITRY, METHODS AND SYSTEMS" granted Jun. 27, 2000 and incorporated herein by reference.

Figure 5:
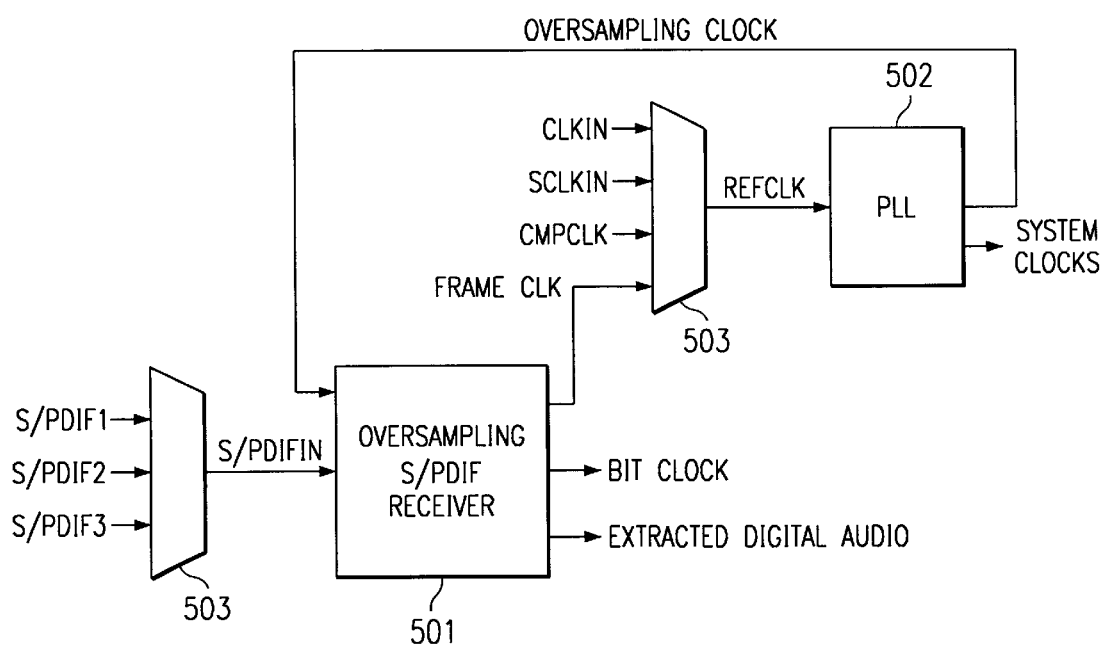
FIG. 5 is a functional block diagram generally showing the relationship between an oversampling S/PDIF (AES/EBU) receiver and a clock generation phase—locked loop (PLL)

FIG. 5 is a functional block diagram generally showing the relationship between an oversampling S/PDIF (AES/EBU) receiver 501 and a clock generation phase—locked loop (PLL) 502. PLL 502 is a conventional PLL which operates in conjunction with a voltage controlled oscillator (VCO)(not shown) and a reference clock (RefClk). In system 100, the reference clock is selected by selection circuitry 503 from an externally generated clock (CLKIN), the serial clock (SCLKIN), the CMP clock (CMPCLK) and the frame clock extracted from the incoming S/PDIF (AES/EBU) bitstream. For purposes of the present discussion, the primary concern will be with the frame clock derived from the S/PDIF stream (AES/EBU).

In the illustrated embodiment, front-end selector circuitry 504 allows the user to select between a number of available S/PDIF streams or sources. In this case, three possible streams have been arbitrarily shown for reference, although the actual number may vary from embodiment to embodiment.

From the selected S/PDIF stream, receiver 501 extracts the frame clock, bit clock, and the digital audio signal. An oversampling clock, discussed further below, is preferably generated by PLL 502, although this is not a requirement for all embodiments.

Figure 6:
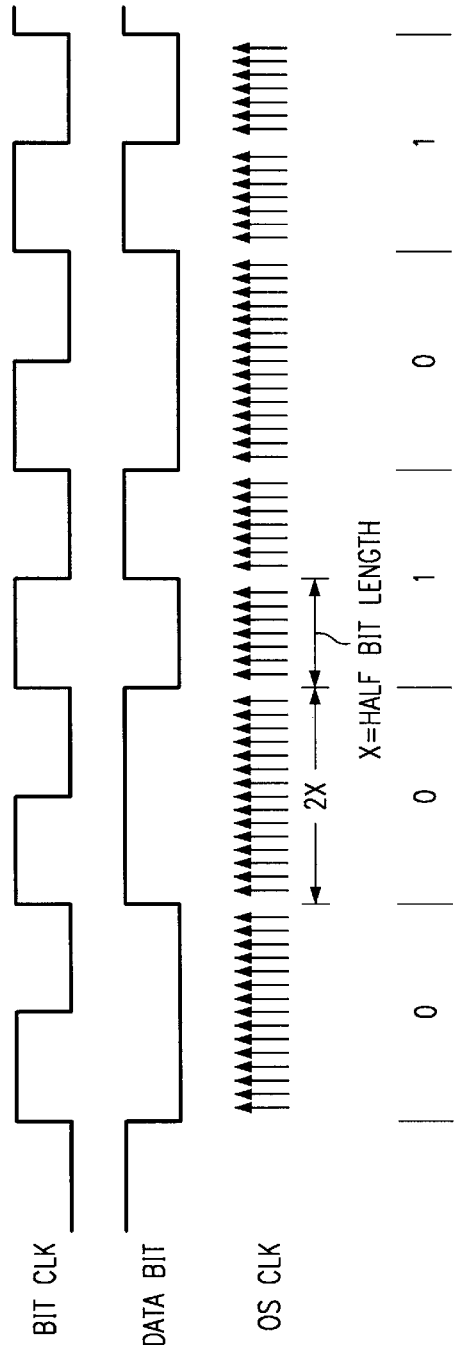
FIG. 6 is a diagram illustrating a few exemplary cycles of a typical biphase encoded bitstream (DATA BIT.
Figure 7:
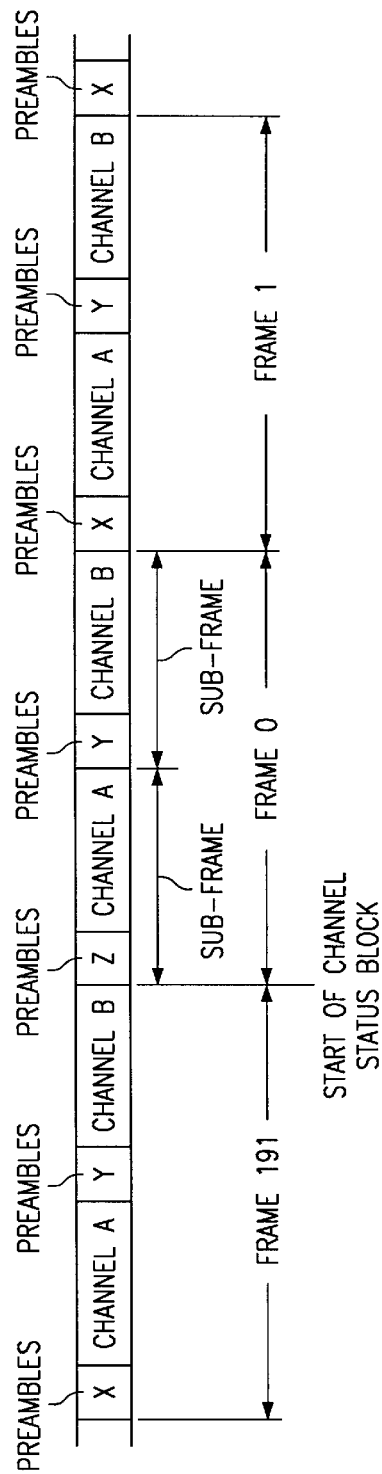
FIG. 7 illustrates a portion of a typical AES/EBU (SPD/IF) data stream.
Figure 8:
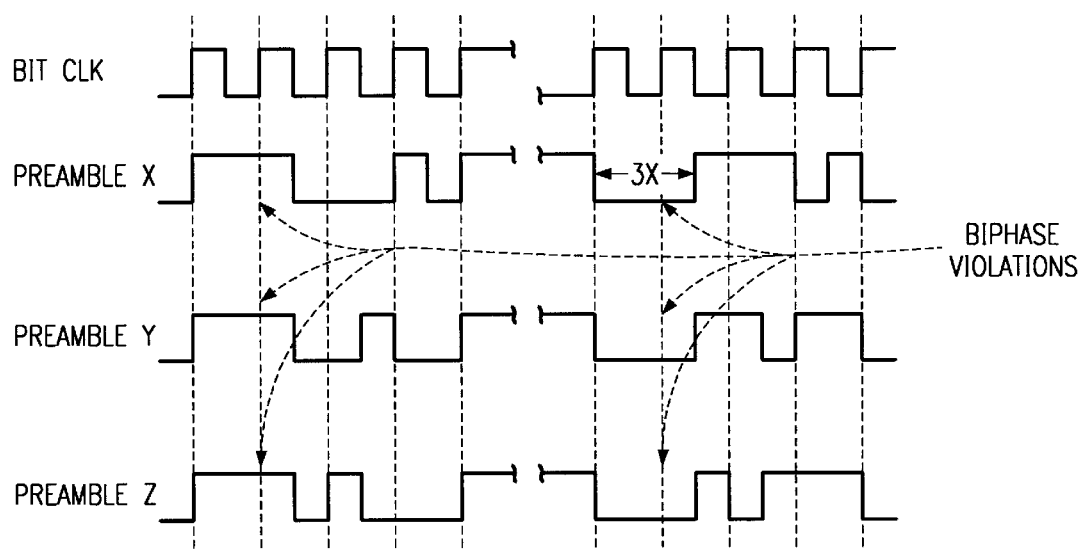
FIG. 8 illustrated the preambles.
Figure 9A:
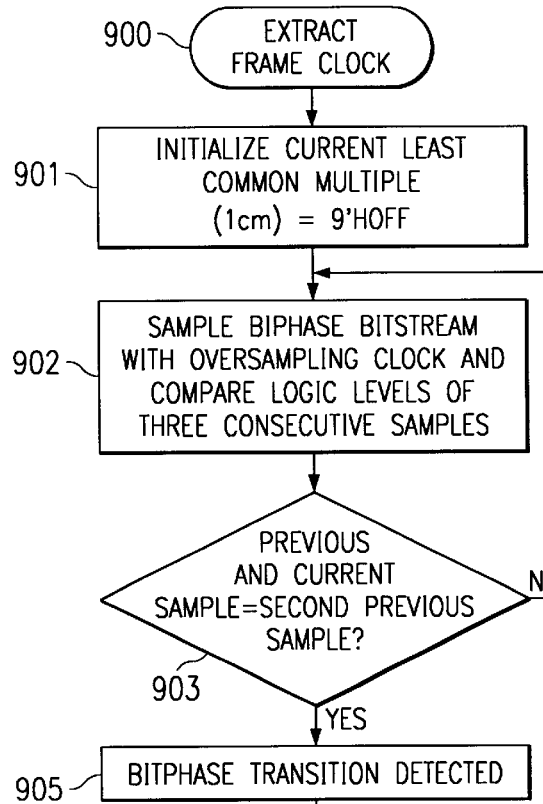
FIG. 9 is a flow chart illustrating a method of clock edge extraction according to the inventive concepts.
Figure 9B:
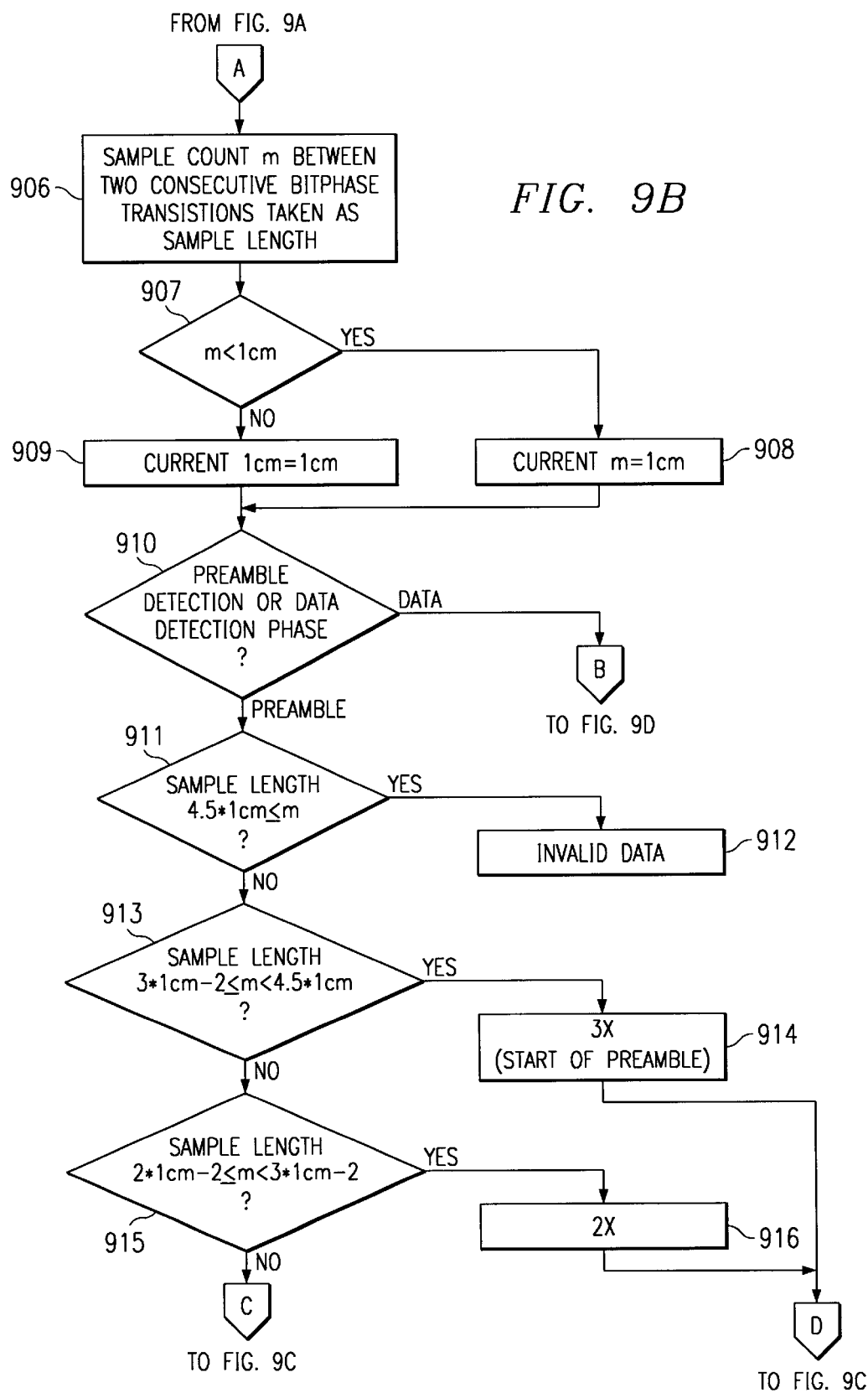
Figure 9C:
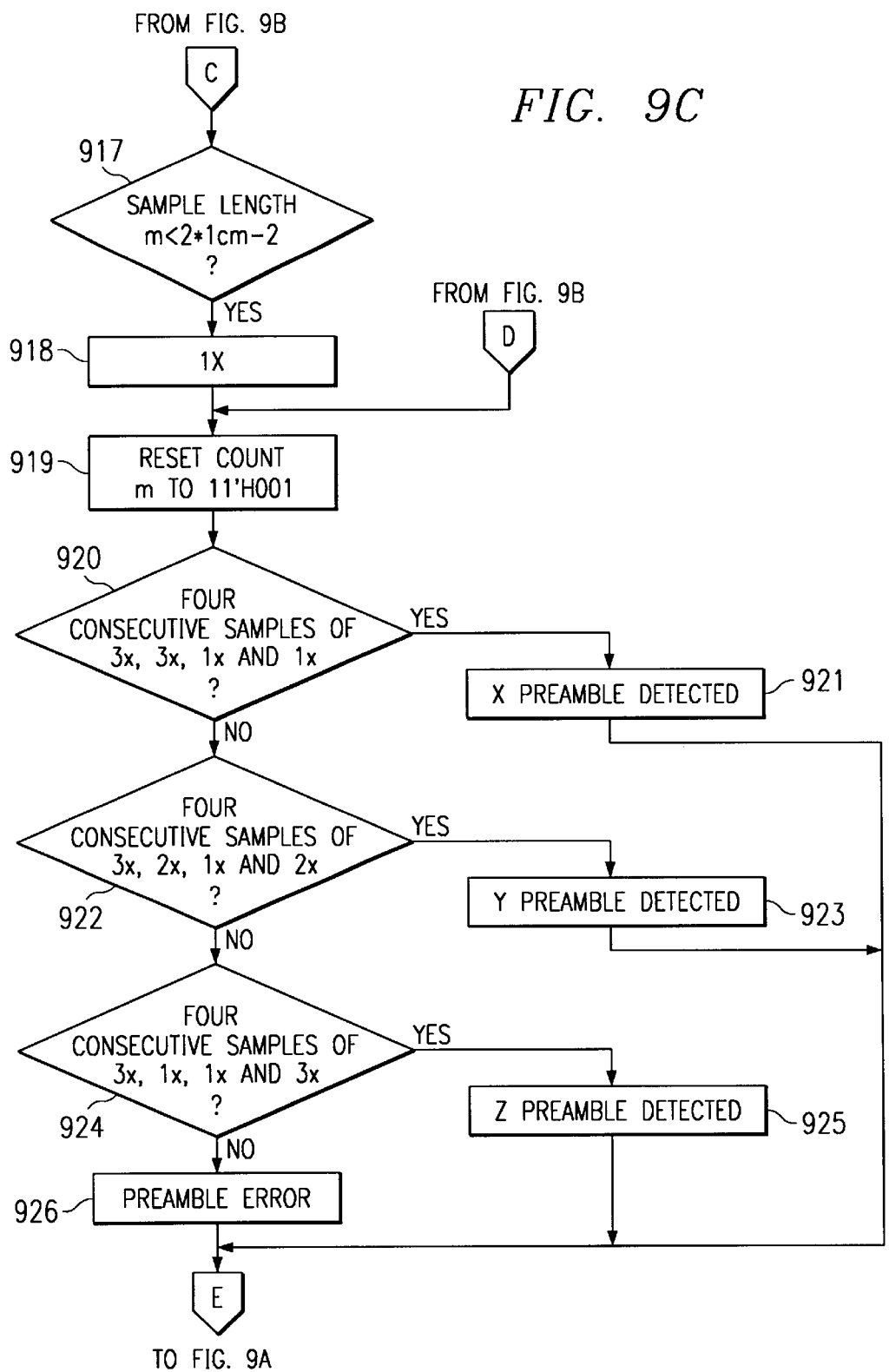
Figure 9D:
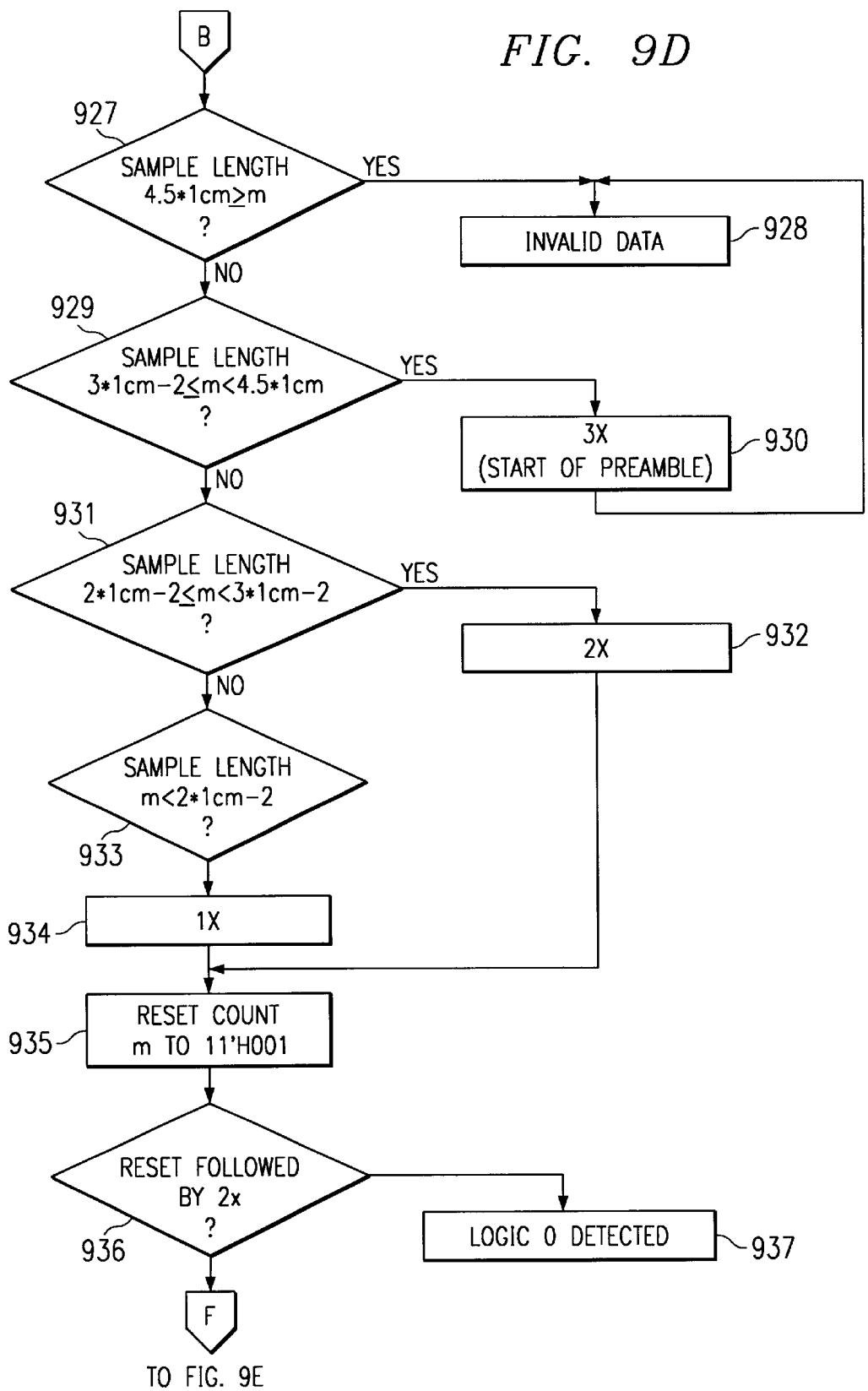
Figure 9E:
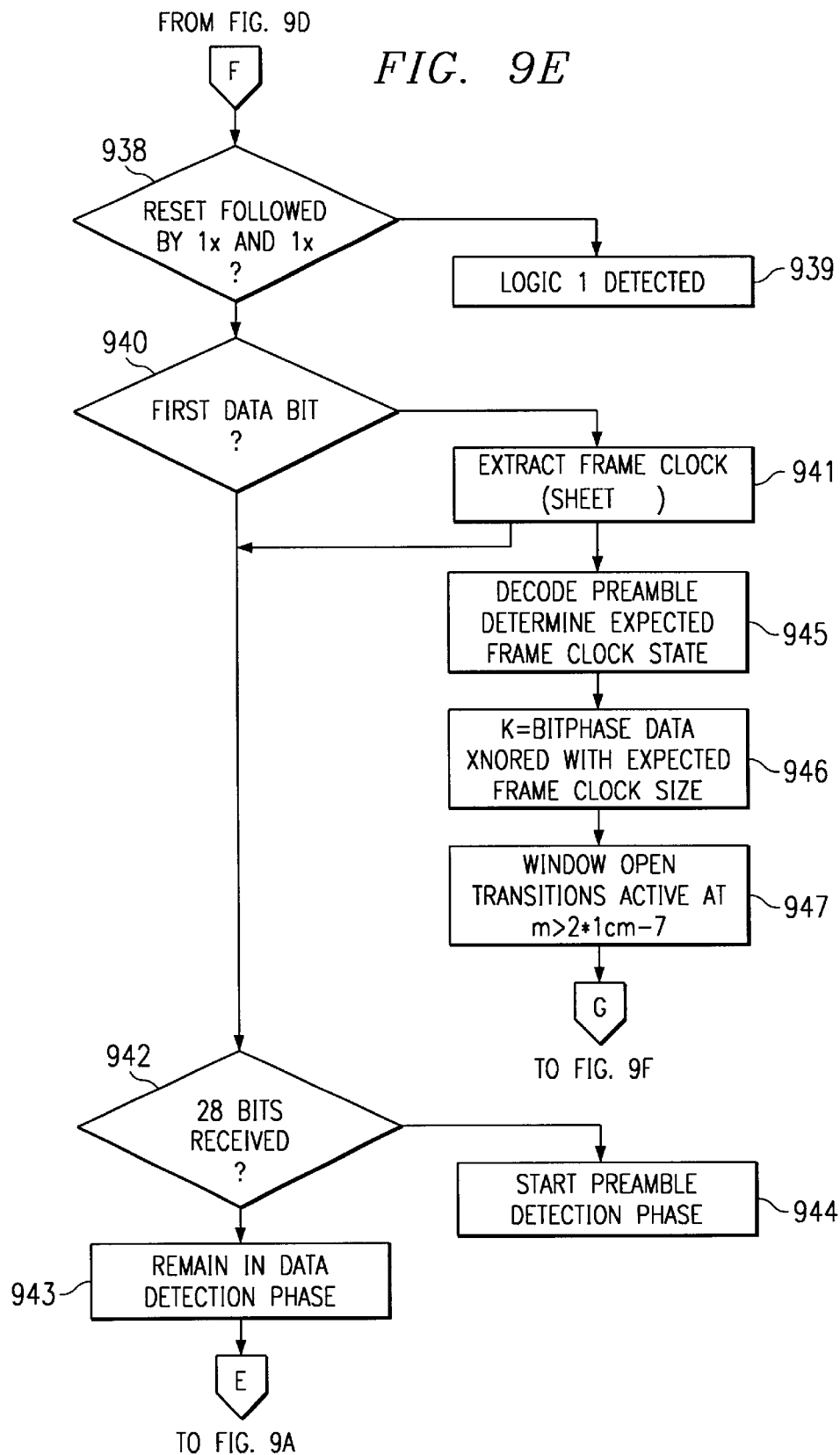
Figure 9F:
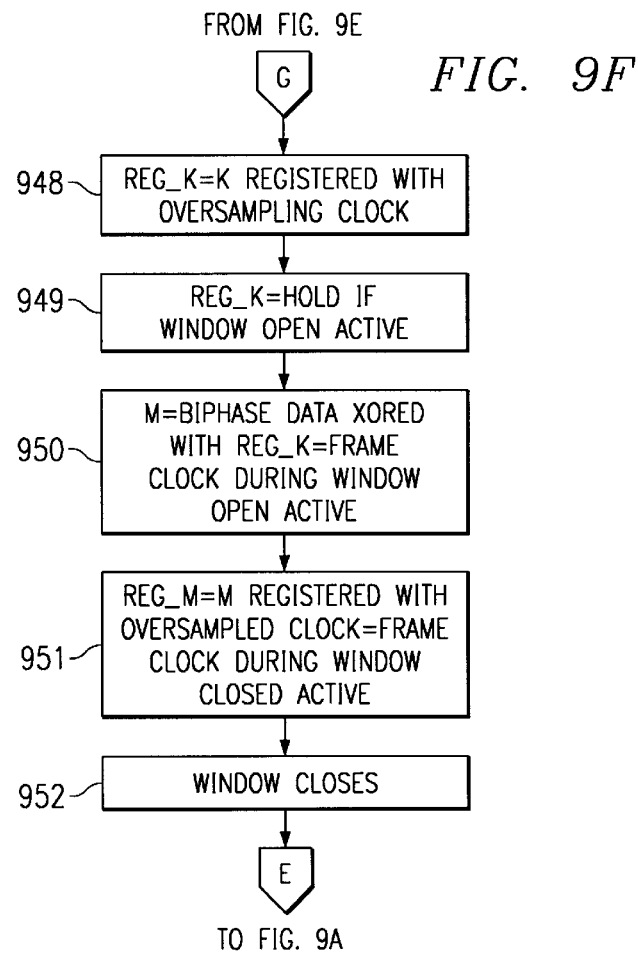

FIG. 6 is a diagram illustrating a few exemplary cycles of a typical biphase encoded bitstream (DATA BIT). In this example, the active edges are the positive (rising) and the inactive edges are the negative (falling) edges, although this particular convention is not required to practice the inventive principles (i.e. the active edges can be the falling edges and the inactive edges can be the rising edges). In this example, a data bit with logic value 0 is represented by logic level transitions at two consecutive active edges of the bit clock BIT CLK. A data bit of logic value 1 is represented by logic level transition at the active edge and a second transition on the following inactive edge of BIT CLK. As a result, there must always be a logic level transition of the data bit at each active edge of the bit clock, otherwise it is considered to be an error in the encoding scheme. (With the exception that preambles by definition include one or more of such biphase errors.) FIG. 7 illustrates a portion of a typical AES/EBU (SPD/IF) data stream. The stream is divided into blocks each composed of 192 frames (Frames 0–191). Each frame in turn is composed a pair of subframes, each including Channel A and Channel B data, along with one of three types of 4-bit preambles. An X preamble precedes each Channel A subframe (except at the beginning of the block), a Y preamble precedes each Channel B subframe and a Z preamble precedes each Channel A subframe at the beginning of the block. The preambles are shown in FIG. 8.

The channel data for a typical subframe consists of 4 bits of auxiliary data, 20 bits of audio data, a validity bit, a user data bit, a channel status bit, and a parity bit. The bitstream also includes channel status blocks for each channel. For the AES/EBU format, these blocks include control information (e.g. channel mode, word length, sampling frequency and emphasis), source and destination data, local sample address codes, time of day codes, reliability flags and cyclic redundancy check (CRC) characters. For the SPD/IF format, the channel status blocks hold information, such as a copying code, emphasis, a category code, a mode bit, source and channel numbers, and the sampling frequency.

A preferred method 900 of extracting the clocks, and in particular the Frame Clock, from an AES/EBU or SPD/IF bit stream is illustrated in the flow chart of FIG. 9.

The preferred decoding algorithm first estimates the half bit sample length x (in units of time) shown in FIG. 1 by using the oversampled clock and counting the number of oversamples within the half bit (where a half bit is defined between a consecutive active and inactive edge, as shown in FIG. 6). This count m, after reception of a half bit, becomes the least common multiple (1 cm). All the sample sizes in the incoming biphase encoded bit stream will be an integer multiple of half-bit lengths and thus integer multiples of 1 cm.

Specifically, on reset at Step 901, the 1 cm is initialized to a constant value of 9'h0ff and the bitstream is sampled with the oversampling clock at Step 902. At Step 903, a test is made for a biphase transition, preferably from the logic levels of three consecutive oversamples. In particular, a logic level (biphase bit) transition is detected when the polarity of the current and immediately previous samples are opposite in polarity from the second previous sample. If no bit phase transition is detected, the oversampling continues with the oversampling count m incremented at Step 904 and the procedure looped back to Step 902.

When a bit transition is detected at Step 905, the count m, which is the number of oversamples between consecutive bit phase transitions, is taken to be the sample size m (Step 906).

At Step 907, the 1 cm is assigned the most recently calculated sample size m, if m<1 cm (Step 908, or maintains it current value (Step 909), if m≧1 cm As a result, once a half bit biphase encoded sample has been received, the 1 cm will have a value that represents the half bit sample length x. In the case of AES/BEU (S/PDIF) bit streams, 1 cm converges rapidly to x, since the AES/BEU (S/PDIF) preambles are guaranteed to have a half bit sample of length x, and therefore it will take at most one sub-frame for the 1 cm to settle down to its final value of x.

In the processing of AES/BEU (S/PDIF) bit phase encoded data, two phases are required for each subframe, one to detect the preambles, and the second to detect actual data bits. This branch is shown in FIG. 9 at Step 910. The preamble detection phase will be considered first.

In an ideal situation, after the final value of the 1 cm has been reached, a sample size of m=1 cm will represent a sample of length x, a sample size of m=2*1 cm will represent a sample of length 2*x and a sample size of m=3*1 cm will represent a sample of length 3*x. Hence, a sample size of m=1 cm followed by a sample size of m=1 cm will indicate a logic value 1, a sample size of m=2*1 cm will indicate a logic value of 0 and a sample size of m=3*1 cm will indicate the beginning of a preamble or a biphase encoding error. But due to jitter present in the input bit stream and in the oversampled clock, the sample size m will vary from one sample to another for the same length sample. To accommodate for this sample size variation, the following ranges have been defined in the preferred embodiment:

if $m<2*1$ cm$-2$, then sample length=$x$     (i)

if $2*1$ cm$-2 \leq m<3*1$ cm$-2$, then sample length=$2x$     (ii)

if $3*1$ cm$-2 \leq m<4.5*1$ cm , then sample length=$3x$     (iii)

If $4.5*1$ cm$\leq m$, then invalid data     (iv)

These definitions are then used in the preferred embodiment to decode the incoming data stream. In particular, if at Step 911 it is found that 4.5×1 cm≦m, then an error has occurred and an error message must be generated and/or the current samples discarded at Step 912. On the other hand, if m falls within the constraints 3*1 cm−2≦m<4.5*1 cm at Step 913, then the sample length=3x which corresponds to the start of a preamble (Step 914). Similarly, if at Step 915 it is found that 2*1 cm−2≦m<3*1 cm−2, then the sample length=2x (Step 913). A sample of length x is found when m<2*1 cm−2 at Steps 917 and 918.

After each sample length is determined, the oversample count (sample size) m is reset to 11'h001 at Step 919 in advance of the count of oversampling periods in the next biphase encoded sample.

A state machine decodes the preamble sequence at the beginning of a new channel status block and at the start of each audio data subframe thereafter for the block. An invalid preamble notification is made for errors in the preamble sequence.

As can be seen from FIG. 8, in order to decode a preamble, the sample lengths of four consecutive samples must be examined. Specifically, if during the preamble detection phase at Step 920 four consecutive samples of sample lengths 3x, 3x, 1x and 1x are found, then an X preamble is detected (Step 921). Instead, if a sequence of samples of lengths 3x, 2x, 1x, 2x is found (Step 922) then a Y preamble is detected (Step 923). A Z preamble is detected at Steps 924 and 925 when four consecutive samples are found with lengths of 3x, 1x, 1x, 3x. Any other sequence during the preamble detection phase results in a preamble error being detected at Step 926.

Figure 10:
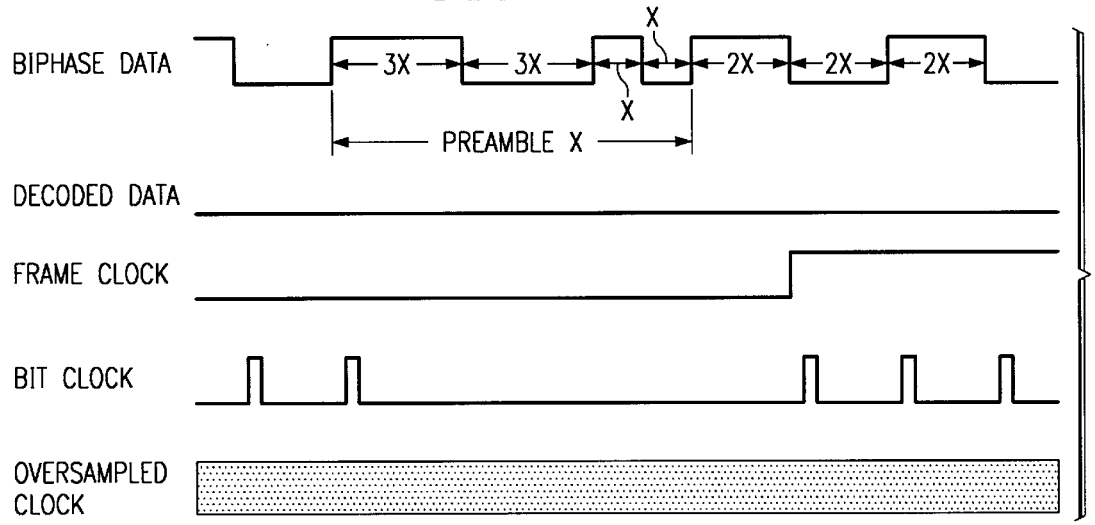
FIG. 10 illustrates the relationship among the incoming biphase data, the decoded data, the frame clock, the bit clock and the oversampled clock
Figure 12B:
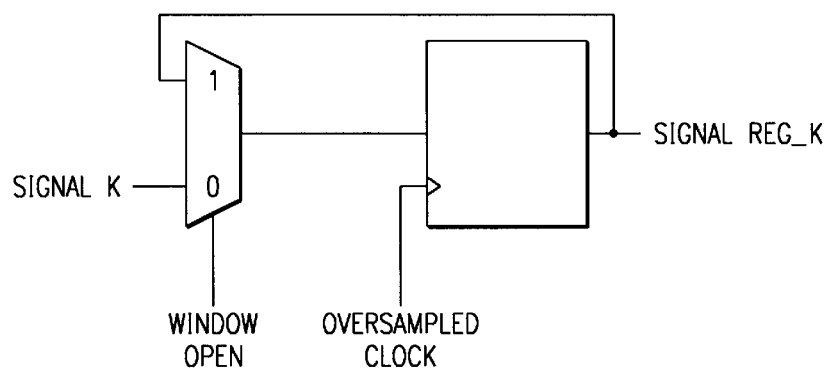
FIG. 12A, B, C diagrammatically illustrates the four possible cases of the expected new state of the frame clock being determined from the preamble, when right before the window being opened, a signal K is generated by an exclusive-NOR (XNOR) operation of the current logic value of the biphase data and the future (expected) logic value of the frame clock.
Figure 12C:
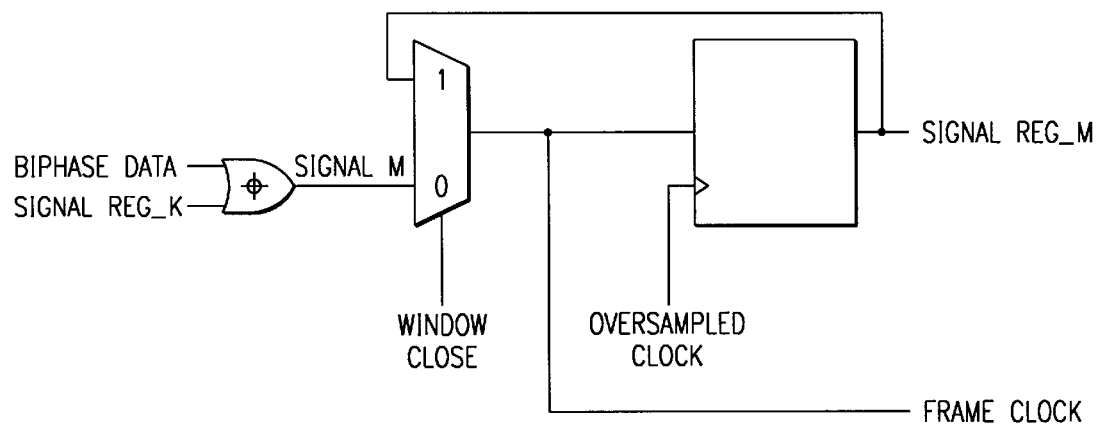

After the preamble detection phase, the process loops back to Step 902 and the data detection phase begins. During this phase, at each transition of the biphase bit sequence the audio sample bits and the control bits are decoded and the frame clock transition occurs. FIG. 10 illustrates the relationship among the incoming biphase data, the decoded data, the frame clock, the bit clock and the oversampled clock. In the preferred embodiment, no bit clock is generated during the preamble detection phase. As such, there will be only 28 positive edges of the bit clock within a subframe instead of the expected 32. If there are biphase violations during the data detection phase, a biphase error signal is generated. At the end of the subframe the parity bit is compared with the parity of the decoded subframe and a parity error is generated if they do not match.

The data detection process is similar to that described above with respects to preamble detection. Once the 1 cm has settled to approximately the half-bit sample length x, the sample length x is then used to decode the biphase encoded data into digital (binary) logic levels. At Step 927, if $4.5*1\ cm \geq m$, then the data are invalid (Step 928). Similarly, at Steps 929 and 930, $3*1\ cm-2 \leq m \leq 4.5*1\ cm$, then a sample of length 3x has been detected, which is invalid during the data detection phase.

A sample length of 2x is detected at Steps 931 and 932 when $2*1\ cm-2 \leq m \leq 3*1\ cm-2$. At Step 933 and 932, a sample of length 1x is detected when $m < 2*1\ cm-2$. Once the sample length is determined the count M can be reset in advance of the next sample at Step 935.

A sample of 2x following reset of the count m can immediately be detected as a digital Logic 0 at steps 936 and 937. However, to detect at logic one, two iterations are required. Specifically, a Logic 1 is detected at Steps 938 and 939 when the reset value of m is followed by tow consecutive samples of lengths 1x.

On the first data bit, the frame clock transition is extracted (Steps 940 and 941). This procedure will be discussed in particular detail below. Generally, however, unless 28 data bits have been received (Step 942), the data detection phase continues (Step 943) and the procedure returns to Step 902 for the start of the next sample. Once 28 data bits have been received, detection of the data of the current subframe is complete, an preparations must be made for the start of the next preamble and the process returns to Step 902.

The extraction of the Frame Clock edge can now be considered in detail. As described earlier, the biphase bit transition detection logic has an uncertainty equal to one period of the oversampled clock. However, since the Frame Clock is preferably used as the PLL reference clock in system 100, it must have minimal jitter. Therefore, the Frame Clock cannot be generated based on the biphase bit transition detection logic alone. The principles of the present invention advantageously allow for the generation of a Frame Clock with minimal jitter, using oversampled least common multiple (1 cm ) techniques After the preamble has been decoded, the first biphase encoded channel data bit can either represent a logic value of zero or a logic value of one. Again, a Logic 1 bit is represented by two consecutive x length samples and a Logic 0 bit is represented by a 2x length sample. In either case, there will be a logic level transition 2x units of time after the last logic level transition of the preamble sequence. This transition is shown in FIG. 11 as Edge M.

According to the inventive concepts, a transition on the Frame Clock is made after detecting Edge M with as little gate delay as possible. Therefore, a "window" is created around Edge M that will make only Edge M "visible."

At Step 944, the expected new state of the frame clock (i.e. a transition from a logic low level to a logic high level or vice versa) is determined from the preamble. Then, right before the window is opened, a signal K is generated at Step 948 by an exclusive-NOR (XNOR) operation of the current logic value of the biphase data and the future (expected) logic value of the frame clock. This is shown diagrammatically for the four possible cases in FIG. 12A.

The window opens up at Step 946 when $m > 2*1\ cm-7$. Signal K is registered using the oversampled clock to generate a signal reg_K (Step 947). While the window remains open, signal reg_K is hold at Step 948. This is shown schematically in FIG. 12B.

At Step 949, the signal reg_K is combined with the incoming biphase bit using an exclusive-OR (XOR) logic operation. This is shown schematically in FIG. 12C. The output of the "exclusive or" gate denoted signal M becomes the frame clock while the window remains open.

The window closes a few oversampled clock cycles after Edge M is detected which ensures the window does not pick up the half bit edge (Edge N in FIG. 12A) in cases where the first data bit represents a Logic 1. Signal M is registered using the oversampled clock and a signal reg_M is generated (Step 950). The window closes at Step 951. While the window remains closed (WINDOW CLOSED) active signal reg_M is hold and becomes the frame clock.

In sum, Signal K is generated such that when Edge M occurs the output of the XOR gate makes the desired frame clock transition. In FIG. 12, for both cases A & B the frame clock transition is from a logic level zero to a logic level one. But since the logic level transition direction of the biphase data is different for these two cases, the polarity of the second input reg_K to the XOR gate differs. The similar situation holds true for cases C & D. The jitter on the frame clock therefore is limited to that generated due to the polarity difference of the signal reg_K at XOR gate input for the same logic level transition direction of the frame clock, as well as any jitter present on the incoming biphase data.

One advantage of the above described biphase data decoding and clock recovery scheme is that no prior information about the frame clock is required. In other schemes, the frequency of the frame clock needs to be known beforehand so that the PLL can be set up for the right operating conditions. The PLL then generates a frequency multiple of the frame clock which is in turn used by the decoding schemes. Using an oversampled approach, as long as the frequency of the oversampled is such that the sample size m satisfies equations (i), (ii), (iii) and (iv), many different frequencies of the frame clock can be extracted.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed:

1. A method of extracting a clock from a biphase encoded bitstream comprising the steps of:
   detecting a stream of samples each having a sample size measured between consecutive bit phase transitions;
   determining a sample length for each sample, the sample length approximating a number of least common multiples in the corresponding sample size;
   detecting a preamble from the sample lengths of a sequence of the samples;
   decoding the preamble to determine an expected logic level of the clock following a transition at an expected clock edge;
   gating the expected level of the clock with the bit phase data encoded to generate a control signal in advance of the opening of a time window; and
   gating the control signal with the biphase encoded data to extract the clock edge after the time window has opened.

2. The method of claim 1 wherein said step of detecting a stream of samples comprises the substep of counting a number of oversampling clock periods between pairs of consecutive bit phase transitions to determine sample size.

3. The method of claim 1 wherein said step of detecting a stream of samples comprises the substep of detecting bit phase transitions according to the substeps of:
   oversampling the incoming bitstream with an oversampling clock;
   determining a logic level of each oversample; and
   detecting a bit phase transition when the logic level of current and previous oversamples differ from the logic level of a second previous oversample.

4. The method of claim 1 and further comprising the steps of closing the window after the clock edge and holding a level of the clock after the window closes.

5. The method of claim 4 wherein said step of holding the level of the clock comprises the step of registering the clock with an oversampling clock.

6. The method of claim 1 and further comprising the step of registering the first control signal with an oversampling clock with the window open.

7. The method of claim 1 wherein the clock comprises a frame clock.

8. A method of generating a frame clock from a biphase encoded audio bitstream comprising the steps of:
   detecting a sequence of bit phase transitions in the audio bitstream, each pair of consecutive bit phase transitions defining a sample having a sample size;
   during a preamble detection phase, performing the steps of:
      determining a sample length for each of a sequence of samples by determining a number of predetermined least common multiples in the corresponding sample size; and
      decoding the sample lengths for the sequence of samples to identify a preamble of a given preamble type;
   during a data detection phase, performing the steps of:
      determining the sample lengths for a sequence of data bits of the biphase bitstream; and
      decoding the sample lengths of the sequence data bits into binary data bits; and
   generating the frame clock in accordance with the steps of:
      determining an expected value of the frame clock level;
      performing an XNOR operation using the expected value of the frame clock level and the bit phase data to generate an intermediate signal;
      during a time window, registering the intermediate signal with an oversampling clock; and
      performing an XOR operation during the time window on the registered intermediate signal and the bit phase data to generate the clock edge of frame clock.

9. The method of claim 8 and further comprising the step of opening the time window at the end of a first data bit of the biphase bitstream following the detected preamble.

10. The method of claim 8 and further comprising the steps of:
    registering the frame clock with the oversampling clock;
    holding the level of the registered frame clock; and
    closing the time window a selected number of oversampling clocks after the frame clock edge.

11. The method of claim 8 and further comprising the step of determining a sample size for each sample including the substep of counting a number of oversampling clocks between the corresponding bit phase transitions defining the corresponding sample.

12. The method of claim 8 wherein said step of decoding the sample length of a sequence of samples to identify a preamble comprises the substeps of:
    identifying a sample of sample length x when $m<2*1\ cm-2$;
    identifying a sample of sample length 2x when $2*1\ cm-2 \leq m < 3*1\ cm-2$;
    identifying a sample of sample length 3x when $3*1\ cm-2 \leq m < 4.5*1\ cm$; and
    identifying an invalid preamble sample when $4.5*1\ cm \leq m$,
where m is the sample size and 1 cm is the least common multiple.

13. The method of claim 8 and further comprising the step of determining the least common multiple comprising the steps of:
    determining a current least common multiple;
    counting the number of oversampling clocks between a pair of bit phase transitions in the bitstream;
    if the count is greater than the current least common multiple, maintaining the current least common multiple; and
    if the count is less than current least common multiple, setting the least common multiple to the count value.

14. The method of claim 8 wherein said step of decoding sample lengths to identify a preamble of a given preamble type comprises the substeps of:
    decoding a sequence of samples of lengths of 3x, 3x, 1x, 1x as an X preamble;
    decoding a sequence of samples of lengths of 3x, 2x, 1x, 2x as a Y preamble; and
    decoding a sequence of samples of lengths of 3x, 1x, 1x, 3x as a Z preamble.

15. The method of claim 8 wherein said step of determining the sample lengths for a sequence of data bits of the biphase bitstream comprises the substeps of:
    identifying a sample of sample length x when $m<2*1\ cm-2$;
    identifying a sample of sample length 2x when $2*1\ cm-2 \leq m < 3*1\ cm-2$;

identifying a sample of sample length 3x when 3*1 cm−2≦m<4.5*1 cm; and identifying an invalid preamble sample when 4.5*1 cm≦m, where m is the sample size and 1 cm is the least common multiple.

16. The method of claim 15 wherein said step of decoding samples lengths of the sequence data bits into binary data bits comprise the substeps of:

decoding a sample of length 2x as a Logic 0;

decoding a sample of length 1x as a Logic 1; and decoding a sample of length 3x as invalid.

17. A audio interface comprising:

a circuitry for extracting a frame clock from a received biphase encoded audio data stream, said receiver operable to:

extract a sequence of samples each defined by a pair of consecutive bit transitions in the biphase bitstream;

determine a length of each of said samples in units of a least common multiple;

detecting a preamble from a sequence of the samples of predetermined lengths;

decoding the preamble to determine an expected logic level of the clock in advance of an open time window;

gating the expected level of the frame clock with the bit phase data to generate a control signal before the opening of the time window; and gating the first control signal with the biphase data to extract an edge of the frame clock.

18. The audio interface of claim 17 wherein said stream of audio data is in accordance with the SP/DIF protocol.

19. The audio interface of claim 17 wherein said stream of audio data is in accordance with the AES/EBU protocol.

20. The audio interface of claim 17 wherein said audio interface comprises a portion of a single-chip audio decoder.

21. The audio interface of claim 20 wherein said audio decoder comprises a pair of digital signal processors.

* * * * *

UNITED STATES PATENT AND TRADEMARK OFFICE
CERTIFICATE OF CORRECTION

PATENT NO.   : 6,782,300 B2
DATED        : August 24, 2004
INVENTOR(S)  : Sanjay Ramakrishna Pillay and Hasibur Rahman It is certified that error appears in the above-identified patent and that said Letters Patent is hereby corrected as shown below:

Column 10,
Line 7, after cm there should be a period.

Column 11,
Line 26, the symbol after m and before 4.5*1 should be a less than symbol.
Line 30, the symbol after m and before 3*1 should be a less than symbol.
Line 30, "Step" should be -- Steps -- and "932" should be -- 934 --.
Line 38, "tow" should be -- two --.

Signed and Sealed this

Fifteenth Day of February, 2005

JON W. DUDAS
*Director of the United States Patent and Trademark Office*